(12) United States Patent
Appleby

(10) Patent No.: US 7,935,374 B2
(45) Date of Patent: May 3, 2011

(54) COATING TO ALLOW ADDITIVES TO ANCHOR TO CASINGS

(75) Inventor: Douglas E. Appleby, Danville, IL (US)

(73) Assignee: ViskoTeepak Belgium NV, Lommel (BE)

( * ) Notice: Subject to any disclaimer, the term of this patent is extended or adjusted under 35 U.S.C. 154(b) by 1371 days.

(21) Appl. No.: 11/273,338

(22) Filed: Nov. 14, 2005

(65) Prior Publication Data

US 2006/0127538 A1    Jun. 15, 2006

Related U.S. Application Data

(60) Provisional application No. 60/628,245, filed on Nov. 15, 2004.

(51) Int. Cl.
*A22C 13/00* (2006.01)

(52) U.S. Cl. ........... 426/135; 426/90; 426/92; 426/125; 426/392; 426/410; 428/34.8; 428/35.2; 428/35.7; 428/32.85

(58) Field of Classification Search .......... 426/135, 426/138, 90, 92, 125, 392, 410; 452/21; 428/34.8, 35.2, 35.7, 32.85
See application file for complete search history.

(56) References Cited

U.S. PATENT DOCUMENTS

| | | | |
|---|---|---|---|
| 1,616,971 A * | 2/1927 | Henderson | 426/140 |
| 3,582,364 A | 6/1971 | Rose et al. | |
| 3,658,561 A | 4/1972 | Rose et al. | |
| 3,867,182 A | 2/1975 | Hammer et al. | |
| 3,898,348 A | 8/1975 | Chiu et al. | |
| 4,132,047 A * | 1/1979 | Gerigk et al. | 53/396 |
| 4,137,947 A | 2/1979 | Bridgeford | |
| 4,196,220 A | 4/1980 | Chiu et al. | |
| 4,248,900 A | 2/1981 | Hammer et al. | |
| 4,543,282 A | 9/1985 | Hammer et al. | |
| 4,563,376 A | 1/1986 | Hammer et al. | |
| 4,596,727 A | 6/1986 | Higgins et al. | |
| 4,781,931 A | 11/1988 | Jon et al. | |
| 5,199,465 A | 4/1993 | Stiem | |
| 5,230,933 A | 7/1993 | Apfeld et al. | |
| 5,382,391 A | 1/1995 | Juhl et al. | |
| 5,480,691 A | 1/1996 | Hammer et al. | |
| 5,595,796 A | 1/1997 | Hammer et al. | |
| 6,251,449 B1 | 6/2001 | Hammer et al. | |
| 6,667,082 B2 * | 12/2003 | Bamore et al. | 428/34.8 |
| 6,991,836 B1 | 1/2006 | Gopal | |
| 2003/0031765 A1 | 2/2003 | Luthra et al. | |
| 2005/0129813 A1 | 6/2005 | Koenig et al. | |
| 2006/0003058 A1 | 1/2006 | Koenig et al. | |
| 2007/0154601 A1 | 7/2007 | Foegler et al. | |
| 2007/0190210 A1 | 8/2007 | Koenig et al. | |

FOREIGN PATENT DOCUMENTS

| | | | |
|---|---|---|---|
| CA | 2 474 934 | * | 8/2003 |
| DE | 3447026 A1 | | 7/1985 |
| EP | 0590263 | | 4/1994 |
| EP | 0 468 284 B1 | | 9/1995 |
| EP | 0 986 957 A1 | | 3/2000 |
| EP | 1 020 117 B1 | | 4/2006 |
| GB | 1449368 | | 9/1976 |
| WO | WO 97/36798 | | 10/1997 |
| WO | WO9736798 | * | 10/1997 |
| WO | WO 98/31731 | | 7/1998 |
| WO | WO 99/51210 | | 10/1999 |
| WO | WO 2004/094544 A1 | | 11/2004 |
| WO | WO 2006/012601 A1 | | 2/2006 |

OTHER PUBLICATIONS

International Search Report and Written Opinion of the International Searching Authority issued in International Application No. PCT/US2005/041004; Mar. 27, 2006; 9 pages.

Communication Pursuant to Article 96(2) EPC issued in European Application No. 05849172.1; Aug. 8, 2007; 3 pages.

International Preliminary Report on Patentability issued in International Application No. PCT/US2005/041004; Oct. 30, 2006; 6 pages.

* cited by examiner

*Primary Examiner* — Rena L Dye
*Assistant Examiner* — Chaim Smith
(74) *Attorney, Agent, or Firm* — Fish & Richardson P.C.

(57) ABSTRACT

Methods of imparting functionality to a food surface are described. In general, a tubular food casing having a surface coated with a polyvinyl alcohol-polyethylene glycol graft copolymer is contacted with a food surface. The functionality is imparted onto the food surface, and in some instances, the polyvinyl alcohol-polyethylene glycol graft copolymer is subsequently removed.

32 Claims, No Drawings

COATING TO ALLOW ADDITIVES TO ANCHOR TO CASINGS

CLAIM OF PRIORITY

This application claims priority under 35 USC §119(e) to U.S. Patent Application Ser. No. 60/628,245, filed on Nov. 15, 2004, the entire contents of which are hereby incorporated by reference.

TECHNICAL FIELD

This invention relates to food casings, more particularly tubular food casings.

BACKGROUND

Food casings generally provide form and packaging properties to food products. However, it is often desirable that the food casings provide additional functionality to the food products. Some examples of desirable functionality include the transfer of color, flavor, surface decoration, preservatives, or antimicrobial agents.

In general, multicomponent systems are used as coatings on a food casing to impart desirable properties to a food surface. However, because these systems require the use of multiple different compounds to emulsify and form a coherent coating, use of these systems can be cumbersome and technically complex.

SUMMARY

Applicants have discovered that a polyvinyl alcohol-polyethylene glycol graft copolymer can be used together with a food casing to provide a vehicle for the attachment or delivery of functional moieties or properties to a food surface. In general, the polyvinyl alcohol-polyethylene glycol graft copolymer can act as a carrier to attach moieties such as colorants, flavorants, and other additives to the food contact surface of the casing, and can subsequently transfer the additive to the meat surface as the food surface water dissolves the carrier.

In general, polyvinyl alcohol-polyethylene glycol graft copolymer solutions containing up to 40% (w/w) solids have relatively low viscosity, lending themselves to high solids coating that can be applied using spray, dip, bubble, or slug coating methods. The polyvinyl alcohol-polyethylene glycol graft copolymer can form a tough, highly flexible film that allows an even coating of the film and secure entrapment of the material it is carrying. Additionally, although the polyvinyl alcohol-polyethylene glycol graft copolymer firmly anchors functional components to a food casing, it can be subsequently dissolved in water, releasing the material it is carrying onto a food surface.

In one aspect, the invention features a tubular food casing including a surface wherein the surface is coated with a polyvinyl alcohol-polyethylene glycol graft copolymer.

In some embodiments, the tubular food casing includes one or more of the following features. The surface further includes a functional moiety, for example, embedded in the polyvinyl alcohol-polyethylene glycol graft copolymer coating. In some embodiments, the surface is an inner surface, a food contacting surface, or the tubular food casing is permeable and the surface is an outer surface. Where the surface is an outer surface, in some embodiments, the functional moiety can migrate through the casing. In some embodiments, the polymer composition ranges from about 10 mole % polyvinyl alcohol and about 90 mole % polyethylene glycol ratio to about 90 mole % polyvinyl alcohol and about 10 mole % polyethylene glycol ratio. In some embodiments, the polymer composition includes about 75 mole % polyvinyl alcohol units and about 25 mole % polyethylene glycol. In some embodiments, the polyvinyl alcohol-polyethylene glycol graft copolymer has a molecular weight from about 30,000 Daltons to about 60,000 Daltons, for example, a molecular weight of about 45,000 Daltons. In some embodiments, the functional moiety is water based, having a solubility in water of greater than 0.1 grams in 100 mL. The functional moiety can be, for example, lipophilic, a colorant, flavorant, pealing aid, adhesion aid, or antiblocking agent. In some embodiments, the polyvinyl alcohol-polyethylene glycol graft copolymer is a component of a composition including particulate additives. In some embodiments, the polyvinyl alcohol-polyethylene glycol graft copolymer is a component of a composition including a spice. The casing can be, for example, a cellulosic casing or a collagen or plastic casing. In some embodiments, the casing has improved elongation strength relative to a corresponding casing substantially free of a polyvinyl alcohol-polyethylene glycol graft copolymer coating. The thickness of the polyvinyl alcohol-polyethylene glycol graft copolymer can be, for example, about 5 microns. In some embodiments, the polyvinyl alcohol-polyethylene glycol graft copolymer includes about 15 grams per square meter on the surface of the tubular food casing. The coating can be, for example, a film, a solution, or a dispersion.

In another aspect, the invention features a method of attaching a functional coating to a food casing including applying a solution or dispersion of a polyvinyl alcohol-polyethylene glycol graft copolymer to a surface of a food casing, wherein the solution or dispersion of the polyvinyl alcohol-polyethylene glycol graft copolymer includes a functional moiety.

In some embodiments, the method includes one or more of the following features. The functional moiety can be, for example, water based or oil based. In some embodiments, the functional moiety is a colorant, flavorant, pigment, or adhesive. In some embodiments, the polyvinyl alcohol-polyethylene glycol graft copolymer is applied as a solution. In some embodiments, the solution includes up to about 20% polyvinyl alcohol-polyethylene glycol graft copolymer. In some embodiments, the polyvinyl alcohol-polyethylene glycol graft copolymer is applied as a dispersion or as a bubble. In some embodiments, the method also includes drying the coated casing to provide a film of polyvinyl alcohol-polyethylene glycol graft copolymer on the surface of the casing. The polyvinyl alcohol-polyethylene glycol graft copolymer can be applied, for example, to an inner surface of the casing or to a food contacting surface of the casing. In some embodiments, the method also includes removing the polyvinyl alcohol-polyethylene glycol graft copolymer, for example, by rinsing the casing with an aqueous solution. In some embodiments, the method also includes processing the food casing, for example where the processing includes a drying stage. Where the processing includes a drying stage, the polyvinyl alcohol-polyethylene glycol graft copolymer can be applied before the drying stage, or after the drying stage. In some embodiments, the method also includes shearing the coated food casing.

In another aspect, the invention features a method of attaching a functional coating to a food surface. The method applying a solution or dispersion of a polyvinyl alcohol-polyethylene glycol graft copolymer to a surface of a tubular food casing, wherein the solution or dispersion of the polyvinyl alcohol-polyethylene glycol graft copolymer comprises a functional moiety; and contacting a food surface with the food casing.

In some embodiments, the method includes one or more of the following features. The polyvinyl alcohol-polyethylene glycol graft copolymer can be applied to an inner surface or a food contacting surface of the tubular food casing. The polyvinyl alcohol-polyethylene glycol graft copolymer can be subsequently removed from the food surface. The polyvinyl alcohol-polyethylene glycol graft copolymer can be applied to an outer surface of the food surface, the functional moiety can, for example, migrate through the casing to the food surface.

In contrast to many earlier compositions used to impart functionality onto a food surface, the polyvinyl alcohol-polyethylene glycol graft copolymer can generally be used alone, and does not require a blending of multiple components to provide the desired carrier function.

The details of one or more embodiments of the invention are set forth in the description below. Other features, objects, and advantages of the invention will be apparent from the description and from the claims.

DETAILED DESCRIPTION

Polymer Carrier for Deposition of Functionality onto Food Surface

A composition coating a food casing can be used as a carrier to anchor a functional moiety to a food surface. Applicants have discovered a polymer that can be used to impart functionality to a food surface, without requiring a mixture of other components. Polyvinyl alcohol-polyethylene glycol graft copolymer can be used to provide a film on a food casing where the chemical nature of the molecule provides the surfactant properties needed for even surface coating. Since the polymer is not inherently an adhesive, like many of the cellulose derivatives under the proper moisture conditions, the surface of the formed film is not tacky and an antiblock agent is not necessary. Moreover, polyvinyl alcohol-polyethylene glycol graft copolymer hydrates in the presence of water, and can be removed during the stuffing and cooking processes, for example, similar to processes used with other cellulose derivatives.

The polyvinyl alcohol-polyethylene glycol graft copolymer forms a strong surface bond with cellulose as it is dried, creating a film that easily withstands the mechanical processing required for food casings. The coating film demonstrates an elongation at break of around 105% compared to similar hydroxypropyl methylcellulose films that are often used for this purpose, which are usually less than 20%. The elongation property permits the coating film to remain cohesive during the stretching of the film at the extremes of processing, stuffing, and cooking.

The surfactant properties of the polyvinyl alcohol-polyethylene glycol graft copolymer make it compatible with water based systems (e.g., functional moieties) as well as oil based functional systems. As a result, the polyvinyl alcohol-polyethylene glycol graft copolymer can serve as a carrier for moieties such as colors, flavors, pigments and liquid smoke without requiring additional components to hold these compounds. The strong film forming properties provide a way to attach seasoning and spices to the surface of the casing.

In preparing coatings for casing products, it is generally desirable to have a solution with easily varied viscosities and an option of high solids loading in the polymer solution. The polyvinyl alcohol-polyethylene glycol graft copolymer is a relatively low viscosity polymer with a viscosity of a 20% solution of less than 250 mPa/S, which is about one fifth the viscosity of comparable cellulose derivative solutions. This permits easy spray application of the solution and permits high solids solutions to be applied by dipping or slug coating.

In general, the polyvinyl alcohol-polyethylene glycol graft copolymer has a molecular weight of about 45,000 Daltons (e.g., between about 30,000 and about 60,000 Daltons, for example 30,000 Daltons, 35,000 Daltons, 40,000 Daltons, 45,000 Daltons, 50,000 Daltons, 55,000 Daltons, or 60,000 Daltons). The polymer composition can range from a 10 mole % polyvinyl alcohol and 90 mole % polyethylene glycol ratio to a 90 mole % polyvinyl alcohol and 10 mole % polyethylene glycol ratio with the preferred composition 75 mole % polyvinyl alcohol unites and 25 mole % polyethylene glycol units. For example, the polymer can include about 10 mole % polyvinyl alcohol and 90 mole % polyethylene glycol ratio, 15 mole % polyvinyl alcohol and 85 mole % polyethylene glycol ratio, 20 mole % polyvinyl alcohol and 70 mole % polyethylene glycol ratio, 25 mole % polyvinyl alcohol and 75 mole % polyethylene glycol ratio, 30 mole % polyvinyl alcohol and 70 mole % polyethylene glycol ratio, 35 mole % polyvinyl alcohol and 65 mole % polyethylene glycol ratio, 40 mole % polyvinyl alcohol and 60 mole % polyethylene glycol ratio, 45 mole % polyvinyl alcohol and 65 mole % polyethylene glycol ratio, or 50 mole % polyvinyl alcohol and 50 mole % polyethylene glycol ratio, 55 mole % polyvinyl alcohol and 45 mole % polyethylene glycol ratio, 60 mole % polyvinyl alcohol and 40 mole % polyethylene glycol ratio, 65 mole % polyvinyl alcohol and 35 mole % polyethylene glycol ratio, 70 mole % polyvinyl alcohol and 30 mole % polyethylene glycol ratio, 75 mole % polyvinyl alcohol and 25 mole % polyethylene glycol ratio, 80 mole % polyvinyl alcohol and 20 mole % polyethylene glycol ratio, 85 mole % polyvinyl alcohol and 15 mole % polyethylene glycol ratio, or 90 mole % polyvinyl alcohol and 10 mole % polyethylene glycol ratio.

The polyvinyl alcohol-polyethylene glycol graft copolymer can be dissolved in acidic, neutral, and alkaline aqueous media up to about 40% (w/w) solution. However, the solution is generally between 5% (w/w) and 25% (w/w), preferably about a 15% (w/w) solution.

Upon evaporation of the solvent, the polyvinyl alcohol-polyethylene glycol graft copolymer leaves a clear, colorless, flexible film with a tenacious affinity for cellulose. The polymer readily redissolves when contacted with water, and can thus be rinsed from the casing surface and transferred to a food surface. The film is deposited onto the food casing in an amount of about 1 to about 30 grams per square meter (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 grams per square meter), preferably about 15 grams per square. The polyvinyl alcohol-polyethylene glycol graft copolymer has surfactant properties that can act as a protective colloid for particulate additives and give surface energies that permit uniform coating of the solids, which leads to uniform dispersion of the solid in the coating and a uniform application on the casing surfaces.

In some instances, it is desirable to use the polyvinyl alcohol-polyethylene glycol graft copolymer in combination with other components in a coating, depending on, for example, the nature of the food surface, the nature of the manufacture process, and the nature of the functional moieties. Examples of these compounds include, but are not limited to cellulose ethers and esters, powders of cellulose, polyolefins, polyamides or silicates.

Food Casings and Methods of Making Same

The term "tubular food casing" as described herein, is generally a flexible tubular film having a thickness of from about 0.02 millimeters to about 0.2 millimeters and a dry flat width of from about 1 centimeter to about 15 centimeters (e.g., 1, 2, 3, 4, 5, 6, 7, 8, 9, 10, 11, 12, 13, 14, or 15). Examples of food casings include cellulose, collagen, or plastic, which can be unreinforced or reinforced, for example cellulose fibers in the form of a paper mate. When the casing is cellulose, it can be cellulose regenerated from derivatized cellulose, for example xanthate viscose, or it can be cellulose precipitated from a solution of non-derivatized cellulose, for example from a solution of cellulose in a mixture of tertiary amine oxide and water.

In the manufacture of nonfibrous regenerated cellulose sausage casings, viscose is typically extruded through an annular die into a coagulating and regenerating bath to produce a tube of regenerated cellulose. This tube is subsequently washed, plasticized e.g. with glycerine, and dried e.g. by inflation under substantial air pressure. After drying, the casing is wound on reels and subsequently shirred on high-speed shirring machines. In the shirring process, typically lengths of from about 40 to about 200 or more feet of casing are compacted (shirred) into tubular sticks of between about 4 and about 30 inches. These shirred casing sticks are packaged and provided to the meat processor who typically causes the casing sticks to be deshirred at extremely high speeds while stuffing the deshirred casing with a meat emulsion. The meat can be subsequently cooked or pasteurized and the casing removed from the meat processed therein with high-speed peeling machines.

In instances where the food surface is functionalized, a polyvinyl alcohol-polyethylene glycol graft copolymer is applied to the surface of the food casing, for example the food contacting surface of the casing. The polyvinyl alcohol-polyethylene glycol graft copolymer can be applied before the drying step, or alternatively can be applied after the drying step.

For fibrous casing, a process of manufacture similar to that for nonfibrous casing is employed, however, the viscose is extruded onto one or both sides of a tube, which is usually formed by folding a web of paper so that the opposing side edges overlap. In production of fibrous casing the viscose impregnates the paper tube where it is coagulated and regenerated to produce a fiber-reinforced tube of regenerated cellulose. The fibrous or paper reinforcement is generally utilized in tubular casing having diameters of about 40 mm or more in order to provide dimensional stability particularly during stuffing with meat emulsion.

Production of both nonfibrous and fibrous casing is well-known in the art and the polyvinyl alcohol-polyethylene glycol graft copolymer can be used with any such well known processes and casings.

Cellulosic casings are typically humidified to a level sufficient to allow the casing to be shirred without undue breakage from brittleness, yet humidification is generally at a level low enough to prevent undue sticking of the casing to the shirring equipment e.g., the mandrel, during the shirring operation. Often a humectant is employed to moderate the rate of moisture take up and casing swelling, to produce a casing which during the shirring operation has sufficient flexibility without undue swelling or stickiness. Typically, a lubricant such as an oil will also be used to facilitate passage of the casing through the shirring equipment e.g., over a shirring mandrel.

It has been useful to lubricate and internally humidify cellulose casings during the shirring process by spraying a mist of water and a stream of lubricant through the shirring mandrel. This is an economical, fast and convenient way to lubricate and/or humidify the casing to increase the flexibility of the casing and facilitate high speed shirring without undue detrimental sticking, tearing or breakage of the casing.

Cellulosic food casings suitable for use in the present invention will preferably have a moisture content of less than about 100 wt. % based upon the weight of bone dry cellulose (BDC). The term "bone dry cellulose" as used herein refers to cellulose such as regenerated, derivatized or nonderivatized cellulose and/or paper which has been dried by heating the cellulose in a convection oven at 160° C. for one hour to remove water moisture. In the formation of cellulosic casing an extruded cellulosic film forms what is known as gel stock casing having a high moisture content in excess of 100 wt. % BDC. This gel stock casing is unsuitable for stuffing with food such as meat emulsion, e.g. to form sausages, because it has insufficient strength to maintain control of stuffing diameter and prevent casing failure due to bursting while under normal stuffing pressure. Gel stock casing is typically dried to a moisture level well below 100 wt. % (BDC) which causes the cellulose to become more dense with increased intermolecular bonding (increased hydrogen bonding). The moisture level of this dried casing may be adjusted, e.g., by remoisturization, to facilitate stuffing. Such remoisturization or moisture adjustment, e.g. by drying to a specific level, for nonfibrous casing is typically to a level with a range of from about 5 to about 40 wt. % BDC. Small diameter nonfibrous casing, prior to shirring, will have a typical moisture content of about 10-20 wt. % BDC, and such small diameter nonfibrous casing when shirred will have a moisture content that has been adjusted to between about 20 to 40 wt. % BDC.

Fibrous casing is generally commercially produced having a moisture content ranging from about 4 wt. % BDC to about 70 wt. % BDC. Typically, premoisturized, ready-to-stuff, fibrous casing which does not require additional soaking or moisturization will have a moisture content of from about 26 to about 70 wt. % BDC. Also, commercialized is fiber-reinforced casing having a moisture level between about 4 to about 25 wt. % BDC. Such low moisture casing may be soaked prior to stuffing by a food processor.

Also, the coating may be applied to thermoplastic casings such as polyamide casings made from monolayer or multilayer structures containing a nylon layer. Nylon casings comprising a blend of nylon with polyester are known as are multilayer casings of nylon with ethylene polymers or copolymers. The term "thermoplastic" casings shall include these various monolayer and multilayer films approved for food processing, the variety of which are to numerous to list.

Methods of Anchoring the Functional Moiety to the Food Stuff and Releasing the Coating Functional moieties can be applied to the food casings described using a polyvinyl alcohol-polyethylene glycol graft copolymer. For example, a functional moiety can be added to a solution of polyvinyl alcohol-polyethylene glycol graft copolymer polymer, which is subsequently deposited on a food casing. The polymer forms a film on the food casing, carrying the functional moiety (e.g., a colorant or flavorant). The food casing is then stuffed with a food product, where the food casing comes into contact with the food surface. In instances where the polymer film is on a food contacting, or inside surface, the functional moiety comes into contact with the food surface upon the stuffing of the food casing. In other instances, the polymer film is on an outside surface of the food casing, in which case the functional moiety then migrates through the food casing to contact the food surface.

Once the functional moiety is in contact with the food surface, the polymer film dissolves. Because the polyvinyl alcohol-polyethylene glycol graft copolymer is water soluble, the polymer migrates into the water phase of the food product, leaving the functional moiety deposited on the food surface.

The polyvinyl alcohol-polyethylene glycol graft copolymer can be applied to the food casing by dipping the food casing into a polymer solution, using a bubble, spraying, or any other method known to those skilled in the art.

EXAMPLES

Example 1

A pigment slurry was prepared using 525 g polyvinyl alcohol-polyethylene glycol graft copolymer, 235 g glycerin, 235 g of an FD&C aluminum lake pigment mixture giving a light smoke color and 2650 g soft water. The slurry was inserted into small code, unreinforced casing before the wet end bull wheel by cutting the process line and pouring the liquid inside (this process is typically called a bubble). A splice was made in the line and the casing dried in the usual fashion. The colored finished casing was easily opened and there were no signs of the casing blocking. The casing was then shirred into a strand, stuffed with a poultry emulsion and cooked. The resulting hotdog product had the color of the applied pigment, which was absorbed onto the surface of the meat and fully removed from the casing.

Example 2

250 mL of a commercial oil based grill flavoring was mixed with 750 mL of a 30% solution of the polyvinyl alcohol-polyethylene glycol graft copolymer in water. After homogenization, the emulsion was applied as a bubble to a finished, unreinforced cellulose casing, inflated between two bull wheels in a drier. Upon drying, the resulting casing was nonblocking and showed no signs of the oil blooming from the surface. After stuffing and cooking, the grill flavor was fully transferred to the meat and provided a pleasant grill flavor to the hotdog.

Example 3

A solution prepared with 10% polyvinyl alcohol-polyethylene glycol graft copolymer and 20% of a commercial caramel color (Color 050, D.D. Williamson, Co.) in water, was applied as a bubble to dry end fibrous casing. The casing was inflated in a low temperature oven for drying and wound into a reel on the dry end of the oven. The coating was dry and did not smear or block. The casing was stuffed with a chopped roast beef product and cooked. The resulting product had a dark oven roasted look imparted to the surface from the casing. The color on the meat was permanent and did not wash off with water.

Example 4

A 10% solution of the polyvinyl alcohol-polyethylene glycol graft copolymer was mixed with 5% of a commercial pigment blend were prepared in water. The solution was applied to finished unreinforced cellulose casing as a spray during the shirring process. The fine mist dried to the casing on contact and required no additional drying. The shirred strand was stuffed with a poultry emulsion and cooked. Upon peeling, the resulting hot dog showed a transfer of the pigment from the casing to the surface of the meat, imparting the intended color to the product.

Example 5

A solution was prepared containing 20% polyvinyl alcohol-polyethylene glycol graft copolymer and 35% alkalized liquid smoke in water. The solution was brushed onto the inside surface of white Unilon plastic film and air dried. The resulting coating was durable and did not release from the film upon wrinkling. The casing was tied at one end and stuffed with a chopped ham preparation. The coating remained intact during this process and did not show any signs of scuffing or flaking off the casing surface. Upon cooking and peeling, the plastic film released the smoke color to the surface of the meat.

A number of embodiments of the invention have been described. Nevertheless, it will be understood that various modifications may be made without departing from the spirit and scope of the invention. Accordingly, other embodiments are within the scope of the following claims.

What is claimed is:

1. A tubular food casing comprising a surface wherein the surface of the tubular food casing is coated with a polyvinyl alcohol-polyethylene glycol graft copolymer, wherein the coated surface comprises a functional moiety.

2. The tubular food casing of claim 1 wherein the functional moiety is embedded in the polyvinyl alcohol-polyethylene glycol graft copolymer coating.

3. The tubular food casing of claim 1 wherein the surface is a food contacting surface.

4. The tubular food casing of claim 1 wherein the tubular food casing is permeable and the surface is an outer surface.

5. The tubular food casing of claim 1 wherein the composition of the graft copolymer ranges from about 10 mole % polyvinyl alcohol and about 90 mole % polyethylene glycol ratio to about 90 mole % polyvinyl alcohol and about 10 mole % polyethylene glycol ratio.

6. The tubular food casing of claim 1 wherein the polyvinyl alcohol-polyethylene glycol graft copolymer has a molecular weight from about 30,000 Daltons to about 60,000 Daltons.

7. The tubular food casing of claim 1 wherein the functional moiety is water based, having a solubility in water of greater than 0.1 grams in 100 mL.

8. The tubular food casing of claim 1 wherein the functional moiety is a colorant, flavorant, pealing aid, adhesion aid, or antiblocking agent.

9. The tubular food casing of claim 1 wherein the polyvinyl alcohol-polyethylene glycol graft copolymer is a component of a composition comprising particulate additives.

10. The tubular food casing of claim 1 wherein the casing is a cellulosic casing.

11. The tubular food casing of claim 1 wherein the casing has improved elongation strength relative to a corresponding casing substantially free of a polyvinyl alcohol-polyethylene glycol graft copolymer coating.

12. The tubular food casing of claim 1, wherein the thickness of the polyvinyl alcohol-polyethylene glycol graft copolymer is about 5 microns.

13. A method of attaching a functional coating to a food casing comprising applying a solution or dispersion comprising a polyvinyl alcohol-polyethylene glycol graft copolymer to a surface of a food casing, wherein the solution or dispersion comprising the polyvinyl alcohol-polyethylene glycol graft copolymer further comprises a functional moiety.

14. The method of claim 13 wherein the functional moiety is water based.

15. The method of claim 13 wherein the functional moiety is a colorant, flavorant, pigment, or adhesive.

16. The method of claim 13 wherein the polyvinyl alcohol-polyethylene glycol graft copolymer is applied as a solution.

17. The method of claim 16 wherein the solution comprises up to about 20% by weight (w/w) of polyvinyl alcohol-polyethylene glycol graft copolymer.

18. The method of claim 13 further comprising drying the coated casing to provide a film of polyvinyl alcohol-polyethylene glycol graft copolymer on the surface of the casing.

19. The method of claim 13 wherein the polyvinyl alcohol-polyethylene glycol graft copolymer is applied to a food contacting surface of the casing.

20. The method of claim 13 further comprising removing the polyvinyl alcohol-polyethylene glycol graft copolymer.

21. The method of claim 20 wherein the polyvinyl alcohol-polyethylene glycol graft copolymer is removed by rinsing the casing with an aqueous solution.

22. The method of claim 13 further comprising drying the food casing.

23. The method of claim 13 further comprising shirring the coated food casing.

24. A method of attaching a functional coating to a food surface, the method comprising;

applying a solution or dispersion comprising a polyvinyl alcohol-polyethylene glycol graft copolymer to a surface of a tubular food casing, wherein the solution or dispersion comprising the polyvinyl alcohol-polyethylene glycol graft copolymer further comprises a functional moiety; and contacting a food surface with the food casing.

25. The tubular food casing of claim 1 wherein the casing is a collagen casing.

26. The tubular food casing of claim 1 wherein the casing is a plastic casing.

27. The tubular food casing of claim 1 wherein the amount of the polyvinyl alcohol-polyethylene glycol is from about 1 g to about 30 g per square meter of the surface.

28. The method of claim 13 wherein the surface is a food contacting surface.

29. The method of claim 13 wherein the tubular food casing is permeable and the surface is an outer surface.

30. The method of claim 13 wherein the casing is a cellulosic casing.

31. The method of claim 13 wherein the casing is a collagen casing.

32. The method of claim 13 wherein the casing is a plastic casing.

* * * * *